United States Patent [19]

Alles et al.

[11] Patent Number: 4,981,633

[45] Date of Patent: Jan. 1, 1991

[54] PROCESS FOR PREPARING A PTC THERMISTOR

[75] Inventors: Aldo B. Alles; Vasantha R. W. Amarakoon, both of Alfred; Vernon L. Burdick, Alfred Station, all of N.Y.

[73] Assignee: Alfred University, Alfred, N.Y.

[21] Appl. No.: 188,306

[22] Filed: Apr. 29, 1988

[51] Int. Cl.$^5$ .............................................. C04B 35/64
[52] U.S. Cl. ........................................ 264/65; 264/66
[58] Field of Search .................................... 264/65, 66

[56] References Cited

PUBLICATIONS

"Instabilities in PTC Resistors", B. M. Kulwicki (Proceedings of the 6th IEEE International Symposium on Applications of Ferroelectrics, Bethlehem, Pa., Jun. 1986), pp. 656–664.

"PTC Materials Technology, 1955–1980", Bernard M. Kulwicki (Advances in Ceramics, vol. 1, Grain Boundary Phenomena in Electronic Ceramics, publ. by American Ceramic Society, Columbus, OH, 1981), pp. 138–155.

"The PTC Effect of Barium Titanate", J. Daniels, K. H. Hardtl & R. Wernicke (Philips Technical Review, vol. 38, No. 3, 1978/79), pp. 73–82.

"Oxidation Phenomena in Semiconducting BaTiO$_3$", Ichiro Ueda and Seiji Ikegami (Journal of the Physical Society of Japan, vol. 20, No. 4, Apr. 1965), pp. 546–552.

"Halogen Treatment of Barium Titanate Semiconductors", G. H. Yonker (Mat. Res. Bulletin, vol. 2, Pergamon Press, Inc.), pp. 401–407.

"The Effect of Firing Atmosphere on the PTCR Effect in Barium Titanate", Christopher S. Best (Abstract of B.S., Alfred University, 1984).

*Primary Examiner*—James Derrington
*Attorney, Agent, or Firm*—Howard J. Greenwald

[57] ABSTRACT

A process for preparing a positive temperature coefficient thermistor is disclosed. This thermistor is comprised of at least about 60 weight percent of undoped, crystalline, ferroelectric material, and it has a room-temperature resistivity of less than 5,000 ohm-centimeters, an undegraded resistivity of at least about 1,000,000 ohm-centimeters, a degraded resistivity of at least about 900,000 ohm-centimeters, a ratio between its undegraded resistivity and its room-temperature resistivity of at least about 1,000, and a ratio between its undegraded resistivity and its degraded resistivity not exceeding 2.0.

The process of this invention is comprised of the steps of sequentially: (1) providing a powder composition comprised of at least about 60 weight percent of undoped, crystalline, ferroelectric material; (2) fabricating the powder composition into a shaped powder compact; (3) sintering said powder compact by subjecting it to a temperature of from about 1150 to about 1450 degrees centigrade for at least about 1 hour, thereby forming a consolidated, sintered body; (4) reducing said sintered body by subjecting it to a temperature of from about 700 to about 1,400 degrees centigrade for at least about 30 minutes while maintaining said sintered body under a reducing atmosphere comprised of hydrogen; and (5) halogenating said reduced, sintered body by subjecting it to a source of halogen while maintaining it in a closed container at a temperature of from about 700 to about 1200 degrees centigrade for at least about 5 minutes.

17 Claims, 2 Drawing Sheets

PROCESS FOR PREPARING A PTC THERMISTOR

FIELD OF THE INVENTION

A process for preparing a positive temperature coefficient thermistor in which a powder compact comprised of an undoped ferroelectric material is first heated in a reducing atmosphere and then halogenated.

BACKGROUND OF THE INVENTION

A thermistor is a material whose resistance varies with temperature. "PTC" thermistors ("positive temperature coefficient") increase their resistivities within a particular temperature range in the vicinity of their ferroelectric Curie temperature. To be practical, PTC thermistors should possess a room-temperature resistivity of no greater than about 5,000 ohm-centimeters and, additionally, should have a resistivity increase at the ferroelectric transition temperature of greater than about three orders of magnitude; see, e.g., "Advances in Ceramics," Volume 1, "Grain Boundary Phenomena in Electronic Ceramics" (American Ceramic Society, Columbus Ohio, 1981), pages 138-154, the disclosure of which is hereby incorporated by reference into this specification. "NTC" ("negative temperature coefficient") thermistors decrease their resistivities with temperature; see, e.g., E. D. Macklen, "Thermistors," (Electrochemical Publications Ltd., 1979), the disclosure of which is also incorporated by reference into this specification.

One common problem with PTC thermistors is that their properties degrade in the presence of either vacuum or reducing/inert atmospheres. Thus, as is disclosed in an article by B. M. Kulwicki entitled "Instabilities in PTC Resistors" (Proc. of the 6th IEEE International Symposium on Applications of Ferroelectricts, Lehigh University, Bethlehem, Penna., June, 1986, at pages 656-664), the disclosure of which is hereby incorporated herein by reference, the magnitude of the increase in resistivity with increasing temperature decreases substantially when the PTC thermistors are annealed in the presence of vacuum or reducing/inert atmospheres. This instability is also disclosed in the aforementioned "Advances in Ceramics", "Grain Boundary Phenomena..." book cited above; see, for example, pages 141 and 152. Thus, as is disclosed on page 152 of said book, a PTC thermistor whose resistivity at 120 degrees centigrade is normally about 100 ohm-centimeters and whose resistivity normally increases to 100,000 ohm-centimeters at 140 degrees centigrade will, when subjected to vacuum at 315 degrees centigrade, only increase its resistivity to 10,000 ohm-centimeters at 140 degrees centigrade. Thus, its property degrades by a factor of 10. If the annealing temperature is higher than 315 degrees centigrade, its property will usually degrade by substantially more than a factor of 10.

In addition to producing PTC thermistors which are substantially unstable, the prior art processes suffer another disadvantage—the PTC thermistors produced by them do not have properties which are readily and consistently reproducible on a large scale basis.

Barium titanate is a material commonly used to produce PTC thermistors. The prior art teaches that, in order to obtain the PTC effect with barium titanate material, it is essential to use chemically doped material. Thus, in a paper by J. Daniels et al. entitled "The PTC effect of barium titanate," (Philips Technical Review, Volume 38, 1978/79, No. 3), it is disclosed at page 81 that: "The second question was; why is the PTC effect not found in undoped $BaTiO_3$ that has been made N-type by a reducing treatment? The answer to this is: under these conditions the material has become N-type due to the formation of oxygen vacancies, and there are no or hardly any barium vacancies present, whose behaviour is a necessary condition for the formation of grain-boundary layers." Thus, e.g., at page 142 of the aforementioned Kulwicki article (appearing in the "Advances in Ceramics book), it is disclosed that "Ceramic $BaTiO_{3-x}$ does not exhibit a PTC anomaly."

Another prior art reference indicating that undoped barium titanate will not exhibit the PTC effect is an article by I. Ueada et al., Journal of the Physical Society of Japan, Vol. 20, No. 4, April, 1965, at pages 546-552. This paper discusses an experiment in which undoped polycrystalline barium titanate was subjected to a temperature of 1,000 degrees centigrade under pure hydrogen for 5 hours. With regard to this sample, the authors stated (at page 552) that "No anomaly is observed in reduced polycrystalline $BaTiO_3$.

The prior art also discloses that, if one has a barium titanate material which exhibits the PTC anamoly (which, must be a chemically doped barium titanate), the increase of the resistivity near the Curie temperature of the material can be increased by halogenating the material. See, e.g., a paper by G. Jonker, "Halogen Treatment of Barium Titanate Semiconductors," Mat. Res. Bull. Vol. 2, pp. 401-407, Pergammon Press Inc.

One problem involving the chemical doping of barium titanate is that, because of the small amounts ( on the order of about 0.2 atom percent) of dopant required, it is very difficult to obtain a homogeneous doped product; unless the dopant is uniformly substituted throughout the barium titanate crystal lattice (and not only on its surface), inhomogeneity will result, and the desired n-type semiconduction (which is essential for the PTC effect) will not be achieved. Another problem involving such chemical doping is that the properties obtainable with the process are not readily and consistently reproducible on a large scale basis.

It is an object of this invention to provide a process for preparing a PTC thermistor with substantially improved stability properties.

It is another object of this invention to provide a process for the production of said PTC thermistor which does not require the use of chemically doped barium titanate.

It is yet another object of this invention to provide a process for the production of said thermistors which provides reproducible results on a large scale basis.

It is yet another object of this invention to provide a process which can be used not only to prepare said PTC thermistors with improved properties but also varistors and capacitors.

SUMMARY OF THE INVENTION

In accordance with this invention, there is provided a process for preparing a positive temperature coefficient thermistor comprised of at least about 50 weight percent of undoped, crystalline, ferroelectric material, wherein said thermistor has a room-temperature resistivity of less than 5,000 ohm-centimeters, an undegraded resistivity of at least about 1,000,000 ohm-centimeters, a degraded resistivity of at least about 900,000 ohm-centimeters, a ratio between its undegraded resistivity and its room-temperature resistivity of at least about 1,000, and a ratio between its undegraded resistivity and its degraded resistivity not exceeding 2.0, comprising the steps of sequentially: (1) providing a powder composition comprised of at least about 60 weight percent of undoped, crystalline, ferroelectric material; (2) fabricating the powder composition into a shaped powder compact; (3) sintering said powder compact by subjecting it to a temperature of from about 1150 to about 1450 degrees centigrade for at least about 1 hour, thereby forming a consolidated, sintered body; (4) reducing said sintered body by subjecting it to a temperature of from about 700 to about 1,400 degrees centigrade for at least about 30 minutes while maintaining said sintered body under a reducing atmosphere comprised of hydrogen; and (5) halogenating said reduced, sintered body by subjecting it to a source of halogen while maintaining it in a closed container at a temperature of from about 700 to about 1200 degrees centigrade for at least about 5 minutes.

DESCRIPTION OF THE DRAWINGS

The present invention will be more fully understood by reference to the following detailed description theroef, when read in conjunction with the attached drawings, wherein like reference numerals refer to like elements and wherein.

DESCRIPTION OF THE PREFERRED EMBODIMENTS

Figure 1:
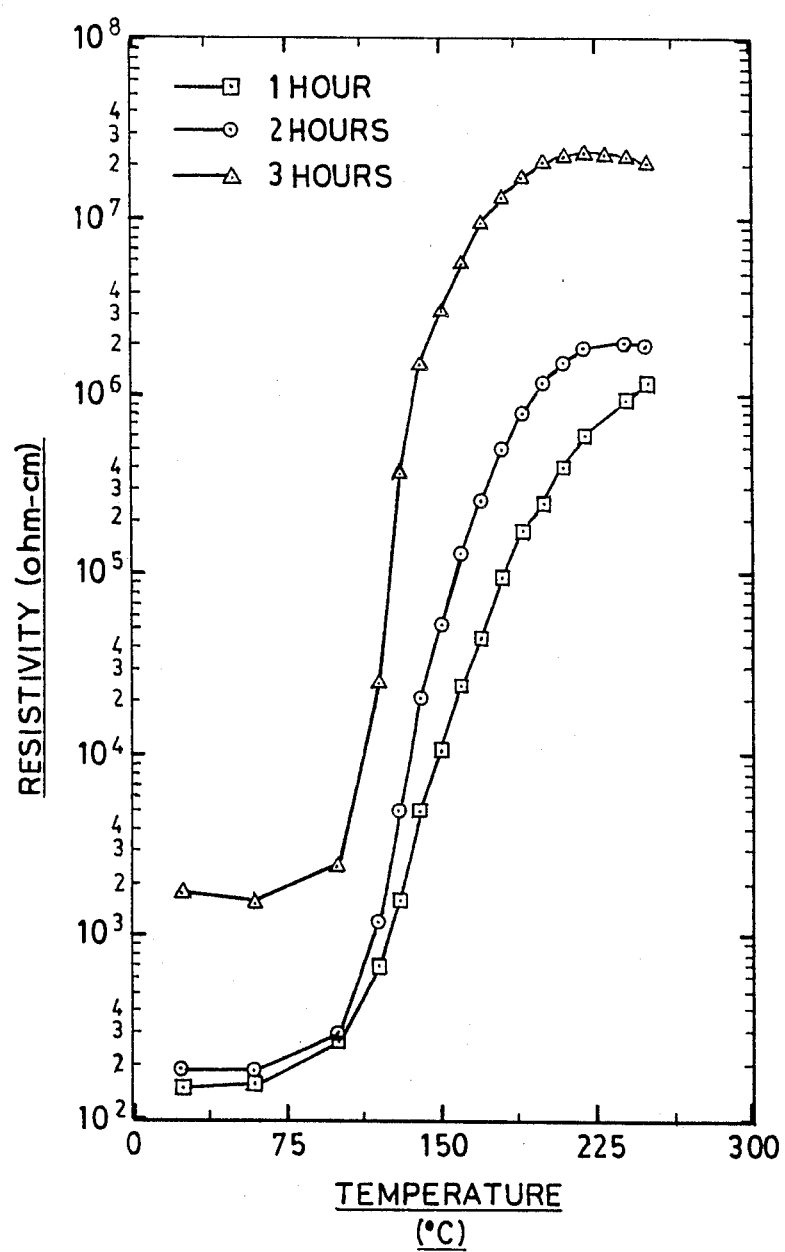
FIG. 1 is a graph of data generated from the experiments described in EXAMPLES 1, 2, and 3 of the specification.

The PTC thermistor produced by the process of this invention has a room temperature resistivity of less than about 5,000 ohm-centimeters and, preferably, less than about 2,000 ohm-centimeters. In a more preferred embodiment, the room-temperature resistivity is less than about 1,000 ohm-centimeters. In the most preferred embodiment, the room-temperature resistivity is less than about 500 ohm-centimeters. As is known to those skilled in the art, resistivity is the resistance,R, of a block of a specified material in terms of unit of length L and cross section A; the unit of volume is 1 cubic centimeter of the material concerned; and the specific resistivity=RA/L The PTC thermistor produced by the process of this invention is comprised of at least about 50 weight percent (by total weight of material) of ferroelectric material. As is known to those skilled in the art, ferroelectric material is that material which exhibits the spontaneous alignment of electric dipoles by their mutual interaction. By way of illustration and not limitation, suitable ferroelectric crystalline materials include materials with the KDP structure such as, e.g., potassium dihydrogen phosphate, rubidium dihydrogen phosphate, potassium dihydrogen arsenate, germanium telluride, and the like. Materials with the perovskite structure also may be used; such materials include, e.g., barium titanate, strontium titanate, potassium niobate, lead titanate, lithium tantalate,lithium niobate, and the like. Mixtures of these materials also can be used. A discussion of these ferroelectric materials may be found in, e.g., C. Kittel's "Introduction to Solid State Physics," Sixth Edition (John Wiley and Sons, Inc., New York, 1986), at pages 373-388, the disclosure of which is hereby incorporated by reference into this case.

It is preferred that the ferroelectric crystalline material have the perovskite structure. Any one of the materials with the perovskite structure listed above, or any combination thereof, may be used. Thus, by way of illustration, one may use barium titanate, barium titanate comprised of minor amounts of sintering aids, and the like.

It is preferred that the PTC thermistor be comprised of at least about 60 weight percent of ferroelectric material. In a more preferred embodiment, the thermistor is comprised of at least 80 weight percent of ferroelectric material. In the most preferred embodiment, the PTC thermistor is comprised of at least about 95 weight percent of ferrolectric material.

The PTC thermistor may be comprised of non-ferroelectric materials, in minor amounts. Suitable non-ferroelectric materials include sintering aids (such as, e.g., titania, silica, bismuth oxide, germanates, boric acid and the like), oxides of transition metals (such as manganese oxide, cobalt oxide, chromium oxide, and the like).

The PTC thermistor of this invention, at a temperature of 225 degrees centigrade, has an undegraded resistivity of at least about 1,000,000 ohm-centimeters. As used in this specification, the term undegraded resistivity refers to the resistivity of a freshly-made thermistor tested within 1 hour of the time it is first produced, and prior to the time it has ever been annealed. Electrodes are attached to this freshly-made thermistor, the temperature of the material is raised, and the resistivity of the material at various temperatures is measured. The term annealed, as used in this case, refers to subjecting the material to the presence of either a vacuum of at least 1 Torr and/or inert gas (such as nitrogen, argon) and/or a reducing gas (such as hydrogen, carbon monoxide, ammonia, and the like) to a temperature of from about 300 to about 1000 degrees centigrade for at least about 1 hour. As is indicated by the references cited in the introductory portion of this specification, annealing tends to degrade the properties of the PTC thermistor.

With the PTC thermistor of this invention, the ratio of its undegraded resistivity to its room temperature resistivity is at least 1,000 and, preferably, at least about 10,000.

The PTC thermistor of this invention has a degraded resistivity of no less than 900,000 ohm-centimeters. As used in this specification, the term degraded resistivity refers to an evaluation of the restivity made upon a freshly made sample (less than 1 hour old) of the thermistor. This freshly made sample is first subjected to annealing under nitrogen atmosphere at 420 degrees centigrade for 1 hour. Thereafter, the nitrogen atmosphere is removed, the material is allowed to cool to room temperature, electrodes are attached to the material, the temperature of the material is raised, and the resistivity of the material at various temperatures is measured; the resistivity of the material at 225 degrees centigrade is deemed to be its degraded resistivity.

With the PTC thermistor of this invention, the ratio of the undegraded resistivity (measured at 225 degrees centigrade) to the degraded resistivity (also measured at 225 degrees centigrade, after annealing) is no greater than about 2.0 and, preferably, is no greater than about 1.5. In one preferred embodiment, said ratio is no greater than about 1.2.

In the first step of the process of this invention, a powder composition comprised of at least about 50 weight percent of one or more undoped ferroelectric materials is provided. As used in this specification, the term powder refers to material with a particle size distribution such that at least about 90 percent (by weight) of the particles in the powder have a particle size in the range of from about 0.1 to about 1,000 microns. As those in the art are aware, powders of ferroelectric materials are commonly avaiable and may be used in the process of this invention to prepare said composition.

It is preferred that said composition contain at least about 60 weight percent of at least one undoped ferroelectric material. It is more preferred that said composition contain at least about 80 weight percent of undoped ferroelectric material. In the most preferred embodiment, the composition is comprised of at least about 95 weight percent of undoped ferroelectric material.

The term undoped, as used in this specification, refers to a ferroelectric crystalline material to which an alivovalent dopant (i.e., one which contains one or more cations with a valence higher than that of the cation[s]in the crystal lattice and whose cations will substitute for one or more of the cations in the crystal lattice of the ferroelectric material) has not been added in an amount of at least about 0.001 atom percent. As those skilled in the art are well aware, unless the addition of a material causes such substitution and also introduces new localized energy levels for electrons intermediate between the valence band and the conduction band, the material is undoped. See, for example, pages 888–899 of Kingery et al., "Introduction to Ceramics," (John Wiley and Sons, New York, 1976), the disclosure of which is hereby incorporated by reference into this specification.

In the second step of the process, the undoped powder composition is fabricated by conventional means into a shaped green body. Any of the fabrication means for preparing unfired powder compacts known to those skilled in the art may be used. Thus, by way of illustration, one can dry press the powder composition to a compact of the desired shape, one can form the powder compact by isostatic pressing, by extrusion, by casting,by plastic pressing, by injection molding, and the like. These fabrication means are described, e.g., in J. S. Reed's "Introduction to the Principles of Ceramic Processing," (John Wiley & Sons, New York, 1988), the disclosure of which is hereby incorported by reference into this specification.

In one preferred embodiment, the powder compact is in the shpae of disc. In other embodiment, the powder compact is cylindrical. In yet another embodiment, the powder compact is in the shape of a rectangular prism. In yet another embodiment, the powder compact is in the form of reticulated cyindrical body.

In the third step of this process, the undoped powder compact is sintered by subjecting it to a temperature of from about 1150 to about 1450 degrees centigrade for at least about 1 hour. It is preferred to sinter the powder compact by subjecting it to a temperature of from about 1280 to about 1375 degrees centigrade for at leat about 2 hours. In the most preferred embodiment, the powder compact is sintered for at least about 3 hours. As those skilled in the art are aware, the sintering of the powder agglomerates the small powder particles, causes them to cohere at a temperature below that of complete melting, and forms a consolidated, shaped body.

In the fourth step of the process, the sintered composition comprised of the undoped ferroelectric material(s) is subjected to a temperature of from about 700 to about 1,400 degrees centigrade for at least about 30 minutes while under a reducing atmosphere. The reducing atmosphere used in this step is comprised of hydrogen. To the extent, if any, that the atmosphere contains any other gas or gases besides hydrogen, said other gas or gases must be inert. Suitable inert gases include argon, nitrogen, helium, neon, krypton, xenon, and the like. The preferred inert gas is nitrogen.

In one embodiment, the atmosphere contains at least about 1 percent (by volume) of hydrogen, and the remainder of the atmosphere is inert gas. It is preferred to use at least about 10 percent hydrogen in the atmosphere, with the remainder being inert gas. In another embodiment, at least 50 percent of hydrogen is used. In yet another embodiment, 40 percent of hydrogen and 60 percent of argon is used. In yet another embodiment, 100 percent of hydrogen is used. Other embodiments will be readily apparent to those skilled in the art.

It is preferred to heat the undoped composition for from about 45 to about 75 minutes at a temperature of from about 1100 to about 1250 degrees centigrade under an atmosphere comprised of from about 70 to about 90 percent (by volume) of hydrogen and from about 30 to about 10 percent (by volume) of nitrogen.

In the fifth step of the process, the sintered, reduced sample is halogenated. It is preferred, prior to this halogenation step, to polish the reduced, sintered samples in order to remove the surface layer of sample; the sample may be polished by, e.g., rubbing it with silicon carbide abrasive paper(320 grit) for about 30 seconds. Thereafter, in this step, the sintered, reduced composition is subjected to a source of one or more halogens while being heated to a temperature of from about 700 to about 1,200 degrees centigrade for at least about 5 minutes. It is preferred to halogenate the sintered material at a temperature of from about 800 to about 1100 degrees centigrade for at least about 30 minutes. It is most preferred to halogenate at a temperature of about 900 degrees centigrade for at least about 60 minutes.

In this halogenation, the reduced, sintered material is subjected to a source of one or more halogens while preferably in a closed container in order to minimize its exposure to oxygen, air, or water vapor. Thus, one can use gaseous fluorine, chlorine, or bromine. Alternatively, or additionally, one can use a source of elemental and/or gaseous fluorine and/or chlorine and/or bromine which, at the halogenation temperature of from 700 to 1200 degrees centigrade, will decompose to form the halogen(s) in situ. Some suitable sources of halogen include, for example, 1,1,1,-3,3,3-hexafluoro isopropanol, methylene bromide, trichlorethylene, bromoform, chloroform, trichloroethane, freons such a freon 21, freon 22, and the like, nitrogentrifluoride, nitrogentrichloride, nitrogentribromide, methylene fluoride, hexachorohexane, and the like. Any chemist skilled in the art can readily determine, upon reference to the appropriate tables, which halogenated compounds will yield either elemental and/or gaseous halogens at the temperature of from 700 to 1200 degrees centigrade and, thus, which compounds can be used in this process. These other compounds, which are too numerous to list, are within the scope of this process.

After the halogenation step, the halogenated material may be polished to remove the surface layer of material. Thus, for example, one may polish the material with silicon carbide abrasive paper (first with 320 grit, and then with 600 grit, each for about 30 seconds), diamond abrasives, aluminium oxide abrasives, and the like.

The polished halogenated material may then have electrodes attached to it to form ohmic contacts. Such electrodes may be attached by conventional means such as, e.g., vapor deposition, painting, spraying, sputtering, evaporation, and the like. The electrodes must be made of conductive material such as, e.g., aluminum, silver, gold, tin, copper, palladium, platinum, combinations thereof, etc.

The following examples are presented to illustrate the claimed invention but are not to be deemed limitative thereof. Unless otherwise stated, all parts are by weight and all temperatures are in degrees centigrade.

EXAMPLE 1

Co-precipitated barium titanate powder of sub-micron particle size which contained less than about 100 ppm of impurities was obtained from Tam Ceramics Company of Niagara Falls, N.Y.

Reagent grade titanium dioxide, obtained from the Fisher Chemical Company of Rochester, N.Y., was mixed with the barium titanate by ball-milling in a 500 c.c. polyethylene jar with magnesia-stabilized zirconia media, deionized water, and 0.5 weight percent (by weight of mixture) of fully hydrolyzed polyvinylalcohol binder. 99.7 grams of barium titanate, 0.3 grams of titania, and about 200 grams of water were used. The slurry was mixed for 24 hours in the jar mill.

The milled slurry was then dried in an oven at 30 degrees centigrade for 8 hours to a final moisture content of about 15 percent by weight. The dried cake thus produced was then removed from the oven and ground in a mortar and pestle for about 5 minutes.

The ground material was then dry pressed in a steel die with an internal diameter of 19 millimeters under a pressure of 10,000 p.s.i. with a laboratory hydraulic press. The pressed pellets were disc-shaped, had a mass of about 3 grams, and were 19 millimeters in diameter and about 3 millimeters thick.

The pressed pellets were then sintered by heating them in air in a box furnace at a heating rate of 200 degrees per hour up to a sintering temperature of 1350 degrees centigrade and, after reaching this temperature, held there for 4 hours. The total heating time was 10.5 hours.

The samples were then cooled to ambient temperature in air while they remained in the furnace. Thereafter, the samples were removed from the furnace.

The cooled samples were then placed into an alumina tube furnace and heated to a temperature of 1200 degrees centigrade. The temperature was raised from ambient to 1200 degrees centigrade over a period of about 3 hours. Thereafter, the samples were maintained at 1200 degrees centigrade for 1 hour under a flowing mixture of 80 percent hydrogen (by volume) and 20 percent nitrogen (by volume). Thereafter, the samples were allowed to cool in the furnace under the reducing atmosphere to ambient temperature.

The reduced samples were then removed from the furnace and polished to remove the surface layer. The samples were polished with silicon carbide 320 grit abrasive paper for about 30 seconds on each face of the sample.

The polished samples were then placed into a alumina tube furnace which, after their insertion, was substantially plugged. The temperature of the furnace was raised to 900 degrees centigrade over a period of 2 hours. Thereafter, the samples were maintained at this temperature for 2 hours while a mixture of nitrogen and entrained fluorinated compound was passed over the samples. The nitrogen/fluorinated compound mixture was generated in a flask exterior to the alumina tube furnace. The flask contained 1,1,1-3,3,3-hexafluoro isopropanol, which was at ambient temperature, and through which nitrogen was bubbled to generate the mixture. When the mixture was subjected to the 900 degree centigrade temperature of the tube furnace, gaseous fluorine was generated in situ.

After two hours of the fluorination, the samples were allowed to cool to ambient temperature under the flowing mixture over a period of 4 hours. Thereafter, the cooled samples were removed from the furnace and polished to remove the surface layer from each face of the samples. 320 grit silicon carbide paper was used to polish each face for about 30 seconds. Thereafter, each face was polished with 600 grit silicon carbide paper for about 30 seconds.

The rim of each of the samples was then coated with impervious paint (fingernail polish). Thereafter, aluminum electrodes were attached to each uncoated face of each sample by evaporation. The samples were inserted into a vacuum bell jar with 16 inches internal diameter and a height of 24 inches. The bell jar was then evacuated to a partial pressure of 10 milliTorr. A high-purity aluminum wire of 1 mm. diameter which was located in the bell jar was vaporized using a tungsten heating element, and the vaporized aluminum coated the unpainted faces of the samples.

The coated samples were then removed from the bell jar. The nail polish was then removed from the samples by soaking them in acetone. The samples were then allowed to air dry for 10 seconds.

The d.c. resistivity of the samples were then evaluated using the conventional two-probe method with a Keithly Electrometer (model number 617, Keithly Company, Cleveland, Ohio) at ambient temperature. The room-temperature resistivity of the sample was 200 ohm-centimeters.

One of the samples was then heated to up to 250 degrees centigrade over a period of 18 hours in a convection oven; resistivity measurements were taken at specified temperatures during the heating. The results of these measurements are shown in FIG. for the sample identified as "2 hours." The resistivity at 225 degrees centigrade was 2,500,000 ohm-centimeters.

EXAMPLES 2 AND 3

The procedure of EXAMPLE 1 was substantially followed with the exception that the fluorination time was varied. In EXAMPLE 2, the sample was fluorinated for 1 hour. In EXAMPLE 3, the sample was fluorinated for 3 hours.

The results of these experiments are shown in FIG. 1. The one hour sample is marked with squares for data points; the three hour sample is marked with triangles for data points. EXAMPLE 4

A sample of the fluorinated material produced in EXAMPLE 1 had its electrodes removed by grinding the surfaces of the sample with 600 grit silicon carbide paper for about 30 seconds on each face of the sample. Then the sample was placed in an alumina tube furnace and was heated to a temperature of 420 degrees centigrade over a period of 1 hour. Thereafter, nitrogen was introduced into the furnace and blanketed the sample, and the sample was maintained in nitrogen atmosphere at 420 degrees centigrade for 1 hour. Thereafter, the sample was allowed to cool under nitrogen atmosphere.

The cooled sample was then removed from the furnace, and aluminum electrodes were attached to it in substantial accordance with the procedure of EXAMPLE 1. Thereafter, in accordance with the proceudre of EXAMPLE 1, the d.c. resistivity of the sample was evaluated.

Figure 2:
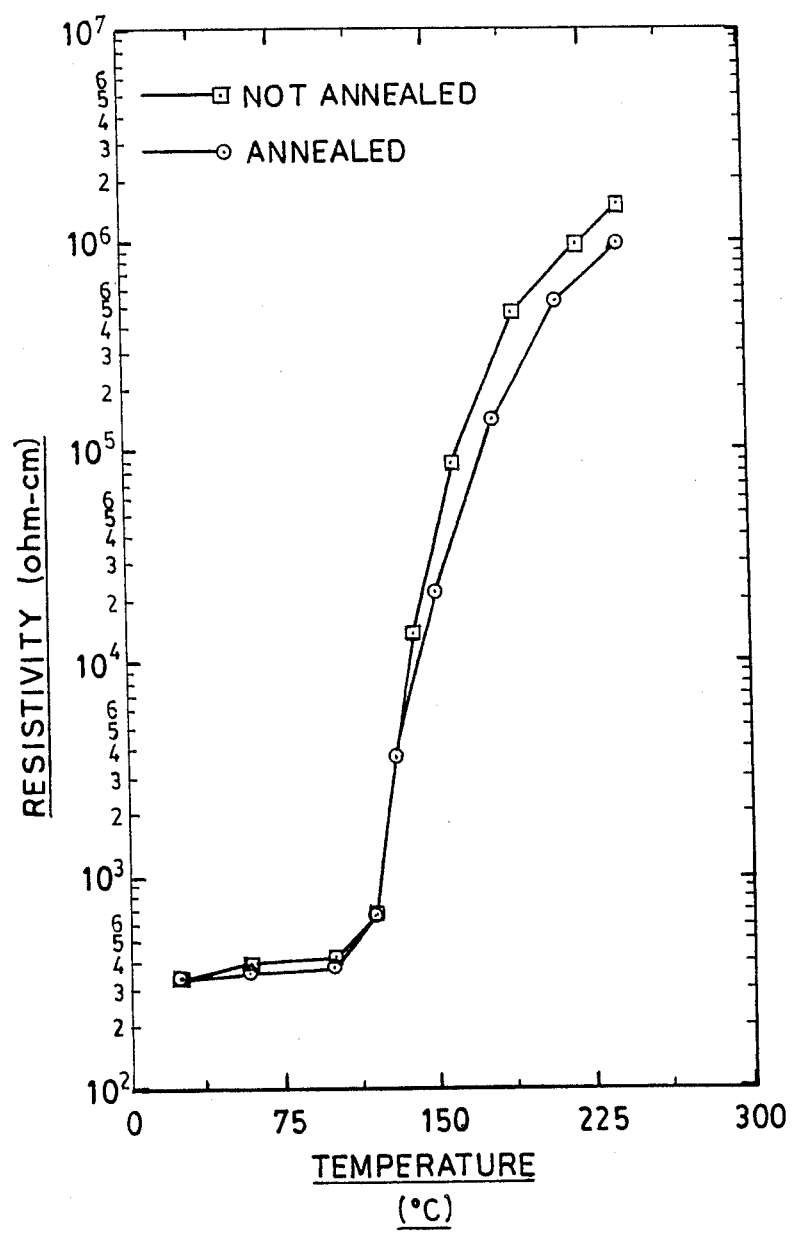
FIG. 2 is a graph of data generated from the experiment described in EXAMPLE 4 of the specification.

The results of this evaluation are shown graphically in FIG. 2. The curve with the circles as data points shows the properties of the annealed sample of this example. The curve with the squares as data points shows the properties of a controlled, unannealed sample from EXAMPLE 1. It should be noted that the properties of the annealed and unannealed samples are virtually identical.

The process of this invention may also be used to produce varistors. Substantially the same process is used as described above to produce the PTC thermistor, but a different starting powder composition is used. Instead of using a composition comprised of at least 60 weight percent of ferroelectric material, one uses a powder composition comprised of at least about 90 weight percent of a metal oxide. Suitable metal oxides include zinc oxide, cadmium oxide, titanium dioxide, cobalt oxide, vanadium oxide, nickel oxide, ruthenim oxide, rhenium trioxide, tin oxide, tungsten oxide, mixtures thereof, and the like. With this process, substantially any metal oxide which can be made semiconducting by exposing it to an atmosphere of low partial pressure of oxygen at a high temperature can be used.

The process of this invention also can be used to prepare internal boundary layer capacitors with apparent relative dielectric constants in the range of 100,000. Again substantially the same process is used as with the PTC thermistors, but the starting material may be different. The starting material may be a powder comprised of at least about 90 percent of one or more transition metal oxides, one or more oxide compounds with the perovskite structure such as strontium titanate, zinc oxide, stannic oxide, cadmium oxide, and the like. With the starting material in this embodiment, however, the room-temperature resistivity is at least about 100,000,000 ohm-centimeters. One chooses the material and/or the halogenatin conditions so that the room-temperature resistivity will be suitably high. Without wishing to be bound to any theory, applicants believe that the high room-temperature resistivity must come from the grain boundary portion of the polycrystalline body which contain semiconducting grains.

As will be apparent to those skilled in the art, other devices whose grain boundary resistivity will be affected by the process of this invention also can be advantageously produced.

What is claimed is:

1. A process for preparing a positive temperature coefficient thermistor comprised of at least about 50 weight percent of undoped, crystalline, ferroelectric material, wherein said thermistor has a room-temperature resistivity of less than 5,000 ohm-centimeters, an undegraded resistivity of at least about 1,000,000 ohm-centimeters, a degraded resistivity of at least about 900,000 ohm-centimeters, a ratio between its undegraded resistivity and its room-temperature resistivity of at least about 1,000, and a ratio between its undegraded resistivity and its degraded resistivity not exceeding 2.0, comprising the steps of sequentially:
   (a) providing a powder composition comprised of at least about 60 weight percent of undoped, crystalline, ferroelectric material;
   (b) fabricating the powder composition into a shaped powder compact;
   (c) sintering said powder compact by subjecting it to a temperature of from about 1150 to about 1450 degrees centigrade for at least about 1 hour, thereby forming a consolidated, sintered body;
   (d) reducing said sintered body by subjecting it to a temperature of from about 700 to about 1,400 degrees centigrade for at least about 30 minutes while maintaining said sintered body under a reducing atmosphere comprised of hydrogen; and
   (e) halogenating said reduced, sintered body by subjecting it to a source of halogen while maintaining it in a closed container at a temperature of from about 700 to about 1200 degrees centigrade for at least about 5 minutes.

2. The process as recited in claim 1, wherein said ferroelectric material has the perovskite structure.

3. The process as recited in claim 2, wherein said powder composition is comprised of at least about 80 weight percent of said ferroelectric material.

4. The process as recited in claim 3, wherein said ferroelectric material is selected from the group consisting of barium titanate, strontium titanate, potassiuim niobate, lead titanate, lithium tantalate, lithium niobate, and mixtures theroef.

5. The process as recited in claim 4, wherein said ferroelectric material is barium titanate.

6. The process as recited in claim 4, wherein said powder composition is comprised of at least 95 weight percent of barium titanate.

7. The process as recited in claim 6, wherein said thermistor has a room-temperature resistivity of less than about 1,000 ohm-centimeters.

8. The process as recited in claim 7, wherein the ratio between the undegraded resistivity and the room-temperature resistivity of said thermistor is at least about 10,000.

9. The process as recited in claim 8, wherein the ratio between the undegraded resistivity and the degraded resistivity of said thermistor is no greater than about 1.5.

10. The process as recited in claim 9, wherein the ratio between the undegraded resistivity and the degraded resistivity of said thermistor is no greater than about 1.2.

11. The process as recited in claim 10, wherein said powder composition is fabricated into a reticulated cylindrical body prior to sintering.

12. The process as recited in claim 10, wherein said powder composition is fabricated into a disc shape prior to sintering.

13. The process as recited in claim 10, wherein said powder compact is sintered by subjecting it to a temperature of from about 1280 to about 1375 degrees centigrade for at least about 2 hours.

14. The process as recited in claim 13, wherein said reducing atmosphere is comprised of at least about 10 percent, by volume, of hydrogen.

15. The process as recited in claim 14, wherein said reducing atmosphere consists of hydorgen and inert gas.

16. The process as recited in claim 13, wherein said sintered body is reduced by subjecting it to a temperature of from about 100 to about 1250 degrees centigrade for from about 45 to about 75 minutes under a reducing atmosphere comprised of from about 70 to about 90 volume percent of hydrogen and from about 30 to about 10 percent, by volume, of nitrogen.

17. The process as recited in claim 15, wherein said reduced, sintered body is halogenated by subjecting it to a source of halogen while maintaining it in a closed container at a temperature of from about 800 to about 1100 degrees centigrade for at least about 30 minutes.

* * * * *